United States Patent
Parker

(10) Patent No.: US 10,655,604 B1
(45) Date of Patent: May 19, 2020

(54) POWER EVACUATED, BARREL IMPELLERED, PNEUMATIC ELECTRIC GENERATING AND STORAGE SYSTEM AND METHODS (PEBI SYSTEM)

(71) Applicant: James R. Parker, Downers Grove, IL (US)

(72) Inventor: James R. Parker, Downers Grove, IL (US)

( * ) Notice: Subject to any disclaimer, the term of this patent is extended or adjusted under 35 U.S.C. 154(b) by 0 days.

(21) Appl. No.: 16/559,133

(22) Filed: Sep. 3, 2019

(51) Int. Cl.
  *F03D 9/32* (2016.01)
  *F01D 17/16* (2006.01)
  *F03D 7/02* (2006.01)
  *B60H 1/22* (2006.01)

(52) U.S. Cl.
  CPC .............. *F03D 9/32* (2016.05); *B60H 1/22* (2013.01); *F01D 17/162* (2013.01); *F03D 7/0272* (2013.01)

(58) Field of Classification Search
  USPC ......... 290/44, 52, 55; 180/2.2, 165; 320/101
  See application file for complete search history.

(56) References Cited

U.S. PATENT DOCUMENTS

| | | | | |
|---|---|---|---|---|
| 3,444,946 A | * | 5/1969 | Waterbury | B60L 11/14 180/2.2 |
| 3,556,239 A | * | 1/1971 | Spahn | B60K 1/00 180/65.25 |
| 3,621,930 A | * | 11/1971 | Dutchak | H02J 7/1415 180/65.31 |
| 3,713,503 A | * | 1/1973 | Haan | B60K 16/00 180/2.2 |
| 3,876,925 A | * | 4/1975 | Stoeckert | B60K 16/00 322/1 |
| 3,878,913 A | * | 4/1975 | Lionts | B60K 1/00 180/2.2 |
| 4,075,545 A | * | 2/1978 | Haberer | B60K 1/04 322/35 |
| 4,141,425 A | * | 2/1979 | Treat | B60K 16/00 180/2.2 |
| 4,168,759 A | * | 9/1979 | Hull | B60K 16/00 180/2.2 |
| 4,179,007 A | * | 12/1979 | Howe | B60K 6/48 180/2.2 |
| 4,254,843 A | * | 3/1981 | Han | B60K 1/00 180/165 |
| 4,314,160 A | * | 2/1982 | Boodman | B60K 16/00 290/55 |

(Continued)

*Primary Examiner* — Pedro J Cuevas
(74) *Attorney, Agent, or Firm* — Richards Patent Law P.C.

(57) ABSTRACT

A vehicle mounted energy generator and storage system includes: a screened air inlet facing a front of the vehicle through which air enters when the vehicle is moving forward; a pneumatic barrel impeller assembly including one or more integral impeller air vanes positioned such that air flowing through the air inlet applies positive pressure to the one or more impeller air vanes to turn the pneumatic barrel impeller assembly and drive one or more generator/transmission assemblies; one or more batteries receiving energy generated by the pneumatic barrel impeller assembly; and an evacuation blower applying negative pressure to the rear of the impeller air vanes by evacuating air through one or more screened outlets not facing the front of the vehicle.

20 Claims, 12 Drawing Sheets

FIG. 3

(56) References Cited

U.S. PATENT DOCUMENTS

| | | | | |
|---|---|---|---|---|
| 4,327,808 | A * | 5/1982 | Howard | B62D 57/04 180/165 |
| 4,423,368 | A * | 12/1983 | Bussiere | F03D 9/25 322/35 |
| 4,424,452 | A * | 1/1984 | Francis | B60L 8/00 290/55 |
| 5,141,173 | A * | 8/1992 | Lay | B60F 5/02 244/2 |
| 5,280,827 | A * | 1/1994 | Taylor | B60K 1/04 180/165 |
| 5,296,746 | A * | 3/1994 | Burkhardt | H02J 7/34 290/55 |
| 5,490,572 | A * | 2/1996 | Tajiri | B60H 1/00278 180/65.1 |
| 5,680,032 | A * | 10/1997 | Pena | B60K 6/105 290/52 |
| 5,850,108 | A * | 12/1998 | Bernard | B60L 8/006 290/54 |
| 5,986,429 | A * | 11/1999 | Mula, Jr. | B60K 16/00 320/101 |
| 6,138,781 | A * | 10/2000 | Hakala | F03D 9/32 180/2.2 |
| 6,373,145 | B1 * | 4/2002 | Hamrick | F03D 9/25 290/44 |
| 6,700,215 | B2 * | 3/2004 | Wu | B60K 25/08 290/44 |
| 6,838,782 | B2 * | 1/2005 | Vu | B60K 6/48 290/55 |
| 6,857,492 | B1 * | 2/2005 | Liskey | B60K 16/00 180/165 |
| 6,882,059 | B1 * | 4/2005 | DePaoli | B60K 16/00 290/44 |
| 6,897,575 | B1 * | 5/2005 | Yu | B60K 16/00 290/44 |
| 7,135,786 | B1 * | 11/2006 | Deets | B60K 16/00 290/55 |
| 7,147,069 | B2 * | 12/2006 | Maberry | B60K 6/48 180/2.2 |
| 7,398,841 | B2 * | 7/2008 | Kaufman | B60K 6/12 180/2.2 |
| 7,434,636 | B2 * | 10/2008 | Sutherland | B60K 6/46 180/2.2 |
| 7,445,064 | B2 * | 11/2008 | Kim | B60K 16/00 180/2.2 |
| 7,665,554 | B1 * | 2/2010 | Walsh | B60K 16/00 180/2.2 |
| 7,802,641 | B2 * | 9/2010 | Friedmann | B60K 16/00 180/2.2 |
| 7,808,121 | B1 * | 10/2010 | Glynn | B60L 8/006 290/55 |
| 7,854,278 | B2 * | 12/2010 | Kaufman | B60K 6/12 180/2.2 |
| 8,098,040 | B1 * | 1/2012 | Botto | B60L 8/006 290/44 |
| 8,162,589 | B2 * | 4/2012 | Moore | F03D 9/32 415/4.2 |
| 8,220,570 | B1 * | 7/2012 | Knickerbocker | B60K 16/00 180/2.2 |
| 8,344,534 | B2 * | 1/2013 | Owens | B60L 8/006 290/44 |
| 8,436,485 | B1 * | 5/2013 | Smith | F03D 9/11 290/55 |
| 8,469,123 | B1 * | 6/2013 | Knickerbocker | B60K 16/00 180/2.2 |
| 8,476,863 | B2 * | 7/2013 | Paasch | B60L 8/006 320/101 |
| 8,513,828 | B1 * | 8/2013 | Ripley | B60L 8/006 290/50 |
| 8,579,054 | B2 * | 11/2013 | Knickerbocker | B60K 16/00 180/2.2 |
| 8,710,691 | B2 * | 4/2014 | Haddad | B60L 8/006 290/55 |
| 8,791,588 | B2 * | 7/2014 | Steinlechner | F03D 1/065 290/55 |
| 8,907,515 | B2 * | 12/2014 | Trachsell | F03D 3/00 290/55 |
| 8,967,302 | B2 * | 3/2015 | Tran | B60K 16/00 180/2.2 |
| 9,059,601 | B2 * | 6/2015 | Rogers | F03D 15/10 |
| 9,428,061 | B1 * | 8/2016 | Ripley | B60L 8/006 |
| 9,566,954 | B2 * | 2/2017 | Moskowitz | B60K 1/04 |
| 9,647,487 | B2 * | 5/2017 | Rogers | F03D 9/11 |
| 9,731,608 | B1 * | 8/2017 | Knickerbocker | B60L 8/006 |
| 9,802,492 | B2 * | 10/2017 | Sikroria | B60L 8/006 |
| 9,834,183 | B2 * | 12/2017 | Moskowitz | B60K 1/04 |
| 10,001,110 | B2 * | 6/2018 | Rogers | B60L 50/51 |
| 10,160,329 | B2 * | 12/2018 | Abou-Zeid | B60L 58/12 |
| 10,160,330 | B2 * | 12/2018 | Kim | F03D 9/32 |
| 10,173,533 | B1 * | 1/2019 | Bird | H02K 7/183 |
| 10,358,038 | B1 * | 7/2019 | Ripley | F03D 3/005 |
| 10,479,197 | B1 * | 11/2019 | Kim | B60L 8/006 |
| 10,500,963 | B2 * | 12/2019 | Sikroria | B60K 16/00 |
| 2002/0066608 | A1 * | 6/2002 | Guenard | B60K 1/00 180/65.22 |
| 2002/0153178 | A1 * | 10/2002 | Limonius | B60L 8/006 180/2.2 |
| 2003/0029581 | A1 * | 2/2003 | Vide | B60K 11/085 160/201 |
| 2003/0155464 | A1 * | 8/2003 | Tseng | B60K 16/00 244/58 |
| 2003/0209370 | A1 * | 11/2003 | Maberry | B60K 6/48 180/2.2 |
| 2004/0084908 | A1 * | 5/2004 | Vu | B60K 6/48 290/55 |
| 2005/0121242 | A1 * | 6/2005 | Robinson | B60L 8/006 180/165 |
| 2005/0252696 | A1 * | 11/2005 | Kaufman | B60K 6/12 180/2.2 |
| 2006/0113118 | A1 * | 6/2006 | Kim | B60K 16/00 180/2.2 |
| 2007/0126238 | A1 * | 6/2007 | Augusto | F03D 1/02 290/52 |
| 2008/0061559 | A1 * | 3/2008 | Hirshberg | F03D 3/0454 290/55 |
| 2009/0314567 | A1 * | 12/2009 | Harrington | B60K 6/48 180/165 |
| 2011/0037261 | A1 * | 2/2011 | Champ | F03D 3/005 290/44 |
| 2012/0049525 | A1 * | 3/2012 | Owens | B60L 8/006 290/50 |
| 2012/0086216 | A1 * | 4/2012 | Ohya | F03B 13/264 290/55 |
| 2012/0299526 | A1 * | 11/2012 | Lambert | B60K 16/00 320/101 |
| 2013/0063071 | A1 * | 3/2013 | Walters | B60L 8/006 320/101 |
| 2013/0101502 | A1 * | 4/2013 | McAlister | B60T 1/00 423/648.1 |
| 2016/0001748 | A1 * | 1/2016 | Moskowitz | B60K 1/04 701/22 |
| 2017/0113661 | A1 * | 4/2017 | Moskowitz | B60L 50/66 |
| 2017/0158060 | A1 * | 6/2017 | Sikroria | B60L 8/006 |
| 2017/0276120 | A1 * | 9/2017 | Petrosyan | B60L 53/00 |
| 2019/0157899 | A1 * | 5/2019 | Bailey | H01M 10/0525 |

* cited by examiner

POWER EVACUATED, BARREL IMPELLERED, PNEUMATIC ELECTRIC GENERATING AND STORAGE SYSTEM AND METHODS (PEBI SYSTEM)

BACKGROUND OF THE INVENTION

The present subject matter relates generally to an energy generator and storage system for vehicles. More specifically, the present invention relates to an electric energy generator and storage system using a wind-driven turbine whose operation is assisted by an air evacuation unit.

Although the internal combustion engine has been the overwhelming market leader in vehicle propulsion since the early 20$^{th}$-century, electric vehicles hold great promise. However, the state of the art in electric vehicles is suboptimal.

First, electric vehicle driving range is limited. On www.tesla.com, the 2019 model of the Tesla Model S is advertised as "the longest electric range of any car on the road—up to 335 miles." However, up to 335 miles is not long enough for all drivers' needs. Moreover, the range is highly dependent on driving conditions, including speed, traffic, driving style, etc. and can be much lower than the advertised range. The ability to practically extend the range of the vehicles is dependent on the network of available charging stations, which is less than complete, even in the most developed countries.

Another complication with the batteries used in electric vehicles is the time they take to recharge. In some instances, a full charge may take a few hours (e.g., typical electric sedan). In other instances, it can be an overnight process (e.g., electric bus). In order to shorten the recharge time, a charging station can provide a higher voltage recharger, but just as the higher voltages shorten recharge times, they also reduce battery life.

In addition to having a limited lifespan, the battery packs used to power electric vehicles have been large and expensive. In some instances, a single battery pack for an electric sedan may top 1,200 lbs. and replacement costs are often prohibitively expensive.

On top of this, the battery packs used in electric vehicles are volatile and a fire hazard. For example, collisions have been known to ignite the battery packs with the resultant fires reaching temperatures of 1,500 degrees.

The costs of the battery packs used in electric vehicles are not limited to those described above; in many instances, the used battery packs that are no longer useful for service become an environmental hazard. For example, many lithium-ion batteries used in electric vehicles contain both nickel and cobalt, which are highly toxic metals. The cost to recover and recycle out-of-service batteries is important to factor into the true cost of the vehicles themselves; otherwise a substantial environmental risk is being ignored.

The environmental impact is not limited to the disposal/recycling of batteries; the generation of the electric energy used to charge the battery also impacts the environment. While these impacts are often significantly lower than the impacts of a comparable internal combustion engine, they are not negligible and, therefore, any improvement to the cleanliness of the electric energy generation would be an improvement to the existing technology.

Accordingly, there is a need for an energy generator and storage system for vehicles, as described herein.

BRIEF SUMMARY OF THE INVENTION

To meet the needs described above and others, the present disclosure provides an energy generator and storage system for vehicles. Specifically, the present disclosure provides a PEBI System using a wind-driven barrel impellered turbine assembly whose operation is assisted by an air evacuation blower. The system is a power evacuated, barrel impellered, pneumatic electric generating and storage system, referred to and marketed under its abbreviation the PEBI System.

As will be understood by those skilled in the art, the present systems and methods are particularly well-adapted for long-range trips and for vehicles such as semi-tractor trailer trucks, small and large box delivery trucks, long-range commercial busses, mobile homes, etc. The systems and methods are also well-adapted for city and school busses, cargo and delivery vans, etc. As further provided herein, embodiments of the systems and methods presented herein are well-suited for standard passenger vehicles. The systems and methods are scalable; therefore, some embodiments may use a single-scale implementation, others a may use a double-scale implementation.

Typical electric vehicles work off the premise of charging the vehicle's battery packs with as much energy as the battery packs can absorb and then driving the vehicle until the battery packs are discharged. The systems and methods provided herein approach the problem from a different perspective.

Those skilled in the art will recognize the various forms in which the teachings of the present disclosure may be embodied. The examples used herein help to illustrate the breadth in the scope of the embodiments that are possible. However, for sake of clarity in this disclosure, the core descriptions used herein to describe the present systems and methods relate to an energy generator and storage system that is adapted for use above the driver's cabin in a standard tractor unit of a conventional 18-wheeler semi-trailer truck, housed within the space of the air dam. As such, the energy generator and storage system may be generally shaped as a standard air dam.

The PEBI System uses an air-flow barrel impellered turbine assembly to generate electric energy. In an example, the PEBI System is mounted above the driver's cab in a standard semi-tractor truck unit. In this example, the PEBI System is designed to be housed within the standard air deflector (air dam) used on many semi-tractor units and large and small box trucks, or within a new air deflector supplied with the PEBI System. By placing the energy generator and storage system on top of the vehicle, the system is better protected from the dust and dirt kicked up in the splash zone caused by other vehicles on the road and the energy generator and storage system mainly replaces what would have been dead space on the vehicle. It is contemplated that the solutions provided herein may be incorporated into the space under an existing air deflector, may be a unit that replaces an existing air deflector, or may be installed by the vehicle manufacturer in place of a standard air deflector.

In the system, the air inlet can deliver air along a lower half of the pneumatic barrel turbine assembly at a first side of the turbine assembly and the evacuation blower can pull air along the lower half of the pneumatic barrel turbine assembly along a second side of the turbine assembly opposite to the first side of the turbine assembly. These elements in combination supply the force to rotate the barrel impeller assembly, which drives one or more generator/transmission assemblies to produce the electric power to operate the vehicle and/or store energy in one or more battery packs, to be used as an alternative power source to operate the vehicle.

In another example, the PEBI System may include: an air inlet facing a front of a vehicle through which incoming air enters when the vehicle is moving forward; a turbine assembly including a barrel impeller and one or more impeller air vanes positioned on the barrel impeller such that air flowing through the air inlet applies positive pressure to the one or more impeller air vanes to turn the barrel impeller and drive one or more generator/transmission assemblies to supply electric power to one or more batteries or to provide a direct electric power source to operate the vehicle; and an evacuation blower applying negative air pressure to a rear of the one or more impeller air vanes by evacuating incoming air through one or more air outlets not facing the front of the vehicle.

A method of generating and storing energy in a vehicle may include: providing an air inlet facing a front of the vehicle through which incoming air enters when the vehicle is moving forward; providing a turbine assembly including a barrel impeller and one or more impeller air vanes positioned such that the incoming air flowing through the air inlet applies positive pressure to a front of the one or more impeller air vanes to turn the turbine assembly and drive one or more generator/transmission assemblies to generate electric power; and providing an evacuation blower applying a negative pressure to a rear of the one or more impeller air vanes by evacuating the incoming air through one or more air outlets not facing the front of the vehicle.

A radiator may be positioned between the air inlet and the turbine assembly such that the air entering the vehicle is heated towards the temperature of the radiator before reaching the turbine assembly. Similarly, a turbine assembly housing may include a top cover panel including one or more back-pressure relief vent holes discharging into a negative air pressure environment surrounding the turbine housing assembly, the negative air pressure environment being created by the evacuation blower.

An energy source selection module in electrical connection with the generator, the one or more battery packs, a voltage regulator, and a fuse panel, wherein the energy source selection module may be provided to select an energy source to connect to the voltage regulator and fuse panel, one or more generators and the one or more battery packs being the energy sources available to be selected by the energy source selection module. The emergency generator may be, for example, a fossil fuel driven internal combustion engine. The turbine assembly may include, for example, a pneumatic barrel impeller assembly including one or more curved impeller air vanes.

In this method, a first generator may include a first transmission (e.g., generator/transmission assembly) coupled to the pneumatic barrel impeller assembly on a first side of the pneumatic barrel impeller assembly along an axis about which the pneumatic barrel impeller assembly rotates and a second generator/transmission assembly coupled to the pneumatic barrel impeller assembly on a second side of the pneumatic barrel impeller assembly along the axis about which the pneumatic barrel impeller assembly rotates such that the rotation of the pneumatic barrel impeller assembly drives the first generator/transmission assembly and the second generator/transmission assembly simultaneously.

In the method of generating and storing energy in a vehicle, the air inlet may deliver air along a lower half of the pneumatic barrel turbine assembly at a first side of the turbine assembly and the evacuation blower may pull air along the lower half of the turbine assembly along a second side of the turbine assembly opposite to the first side of the turbine assembly.

A housing may surround the turbine assembly including one or more top cover panels with back-pressure relief vent holes along a portion of the housing enclosing an upper half of the turbine assembly.

The evacuation blower may be located in a chamber and fed air flowing through a first opening on the lower half of the turbine assembly to a second opening on the second side of the lower half of the turbine assembly and to a third opening through a ducted passage in fluid communication with the one or more back-pressure relief vent holes in the turbine assembly top cover panel. The air is then vented through the exhaust blower to one or more exhaust outlets that may face a right side of the vehicle, a left side of the vehicle, or both.

Each of the first transmission and the second transmission may include a first power transfer gear and a second power transfer gear engaged with, and balancing the load delivered to, a generator gear, wherein the first power transfer gear and the second power transfer gear are driven by an impeller ring gear.

The one or more battery packs may be assemblies of one or more recyclable, lead-acid, deep cycle, 12-volt batteries. It is understood that other battery packs may be used in the systems and methods described herein. It is also contemplated that the one or more battery packs may be mounted on one or more sliding battery cradles, each of which can be slid from a first position to a second position, wherein, in the first position, the one or more battery packs are located within the vehicle and, in the second position, at least a portion of the one or more battery packs is located outside of the vehicle. This adaptation may make the battery packs easier to access for repair and/or replacement. In a preferred embodiment, there are three battery cradle positions: (1) a closed position in which the battery cradle is completely recessed into the vehicle body; (2) a first open position in which half of the battery cradle is exposed outside of the left side of the vehicle; and (3) a second open position in which half of the battery cradle is exposed outside of the right side of the vehicle. In this embodiment, at least half of the battery cradle remains inside of the vehicle at all times to maintain a balanced cantilever load.

In an example, the disclosure provides a vehicle mounted energy generator and storage system including an air inlet facing a front of the vehicle through which air enters when the vehicle is moving forward; a barrel impeller assembly including one or more barrel impeller assembly air vanes positioned such that air flowing through the air inlet applies positive pressure to a front of the one or more impeller air vanes to turn the impeller assembly and drive one or more generator/transmission assemblies to create electric power to operate the vehicle and/or send electric power to one or more battery packs; and an evacuation blower applying a negative air pressure to a rear of the one or more impeller air vanes by evacuating air through one or more exhaust outlets not facing the front of the vehicle.

In an example, the disclosure provides a vehicle mounted PEBI System including an air inlet facing a front of the vehicle through which air enters when the vehicle is moving forward; a turbine assembly (e.g., a pneumatic barrel impellered turbine assembly) including a plurality of barrel impeller air vanes positioned such that air flowing through the air inlet applies positive pressure to a front of the plurality of barrel impeller air vanes to turn the turbine assembly and to a second opening of a lower half of the turbine assembly in fluid communication with and a ducted air flow from one or more back-pressure relief vents in a turbine housing top cover panel and drive a first generator/transmission assembly located on a first side of the turbine assembly along an axis about which the barrel impeller air vanes rotate and a second generator/transmission assembly located on the second side of the turbine assembly along the axis about which the barrel impeller air vanes rotate such that the turbine assembly drives the first generator/transmission and the second generator/transmission assemblies simultaneously, wherein each of the first generator/transmission and the second generator/transmission includes a first power transfer gear and a second power transfer gear engaged with, and balancing the load delivered to, a generator gear, wherein the first power transfer gear and the second power transfer gear are driven by an impeller ring gear; a housing including one or more back-pressure relief vent holes surrounding the turbine assembly; a radiator between the air inlet and the turbine assembly such that the air entering the vehicle is heated towards the temperature of the radiator before reaching the turbine assembly; one or more recyclable, lead acid, deep cycle, marine type battery assemblies (i.e., battery packs) receiving electric energy generated by the turbine assembly mounted on one or more sliding battery pack cradles, each of which can be slid from a first position to a second position, wherein, in the first position, the one or more battery packs are located within the vehicle and, in the second position, at least a portion of the one or more battery packs is located outside of the vehicle; an energy source selection module in electrical connection with the turbine assembly, the one or more battery packs, an emergency generator that is a fossil fuel driven internal combustion engine, and a voltage regulator and a fuse panel, wherein the energy source selection module selects an energy source to connect to the voltage regulator and the fuse panel, wherein the turbine assembly, the one or more battery packs, and the emergency generator are energy sources available to be selected by the energy source selection module; and an evacuation blower applying negative pressure to the one or more turbine vanes by evacuating air through an outlet facing a right side or a left side of the vehicle, wherein the evacuation blower is located in a chamber and fed air flow through a first opening to the second side of the lower half of the pneumatic barrel turbine assembly and to a second opening to a passage in fluid communication with the one or more back-pressure relief vent holes; wherein the air inlet delivers air along a lower half of the pneumatic barrel turbine assembly at a first side of the turbine assembly, the evacuation blower pulls air along the lower half of the pneumatic barrel turbine assembly along a second side of the turbine assembly opposite to the first side of the turbine assembly.

In an example, the disclosure provides a vehicle including an PEBI System including an air inlet facing a front of the vehicle through which air enters the turbine assembly when the vehicle is moving forward; a pneumatic barrel impeller assembly including one or more integral curved impeller air vanes positioned such that air flowing through the front inlet applies positive pressure to a front of one or more impeller air vanes to turn the pneumatic barrel impeller assembly and drive a first generator/transmission assembly located of a first side of the pneumatic barrel impeller assembly along an axis about which the pneumatic barrel impeller assembly rotates and a second generator/transmission assembly located on a second side of the pneumatic barrel impeller assembly along a axis about which the pneumatic barrel impeller assembly rotates such that the rotation of the pneumatic barrel impeller assembly drives the first generator/transmission assembly and the second generator/transmission assembly simultaneously, wherein each of the first transmission and the second transmission includes a first power transfer gear and a second power transfer gear engaged with, and balancing the load delivered to, a generator gear, wherein the first power transfer gear and the second power transfer gear are driven by an impeller ring gear; a housing assembly including a mounting base with heated water pans, end panels, stepped housings, and a top cover panel with one or more back-pressure relief vent holes surrounding the pneumatic barrel impeller assembly; a radiator between the air inlet and the pneumatic barrel impeller assembly such that the air entering the vehicle is heated towards the temperature of the radiator before reaching the pneumatic barrel impeller assembly; one or more recyclable, lead-acid, deep cycle, 12-volt batteries assembled into one or more battery packs receiving energy generated by the pneumatic barrel impeller assembly, the battery packs being mounted on one or more sliding battery pack cradle assemblies, each of which can be slid from a first position to a second position, wherein, in the first position, the one or more batteries are located within the vehicle and, in the second position, at least a portion of the one or more batteries is located outside of the vehicle; an energy source selection module in electrical connection with the pneumatic barrel impeller assembly, the one or more battery packs, an emergency generator assembly that is fossil fuel driven internal combustion engine, and a voltage regulator and a fuse panel, wherein the energy source selection module selects an energy source to connect to the voltage regulator and the fuse panel, wherein the pneumatic barrel impeller assembly, the one or more battery packs, and the emergency generator assembly are energy sources available to be selected by the energy source selection module; and an evacuation blower applying negative pressure to the one or more turbine vanes by evacuating air through one or more exhaust outlets facing a right side or a left side (or both) of the vehicle, wherein the evacuation blower is located in a chamber and fed air flow through a first opening to the second side of the lower half of the pneumatic barrel impeller assembly and to a second opening to a passage in fluid communication with the one or more back-pressure relief vent holes; wherein the air inlet delivers air along a lower half of the pneumatic barrel impeller assembly at a first side of the pneumatic barrel impeller assembly, the evacuation blower pulls air along the lower half of the pneumatic barrel impeller assembly along a second side of the turbine assembly opposite to the first side of the pneumatic barrel impeller assembly.

An advantage of the present system is that, unlike many electric vehicles, the systems and methods taught herein are well-adapted for long-range travel. For example, it is an excellent system to use with semi-trailer trucks. It is also well-adapted for use with small and large box delivery trucks, long-range commercial busses, and mobile homes. It may also be well-suited for use with city and school busses, cargo vans, delivery vans, etc. The PEBI System is also scalable and may be modified for use on automobile vehicles, as will be recognized by those skilled in the art based on the teachings herein.

Another advantage of the present system is the use of recyclable battery packs may help to reduce the impact on the environment.

Another advantage of the present system is the number of battery packs used may be scaled to accommodate vehicles with greater demand for power.

Another advantage of the present system is the battery packs may be easily accessible for service being located on one or more rolling cradles.

Another advantage of the present system is that the battery packs present no greater a fire hazard than typical vehicle batteries and each battery in the battery pack may be individually replaced as needed.

Another advantage of the present system is that it is self-charging and does not require system of charging stations, thus further reducing CO2 emissions.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

The present disclosure provides an electric energy generator and storage system using a wind-driven turbine whose operation is assisted by an air evacuation unit. The system is a power evacuated, barrel impellered, pneumatic electric generating and storage system, referred to by its abbreviation the PEBI System.

Figure 1:
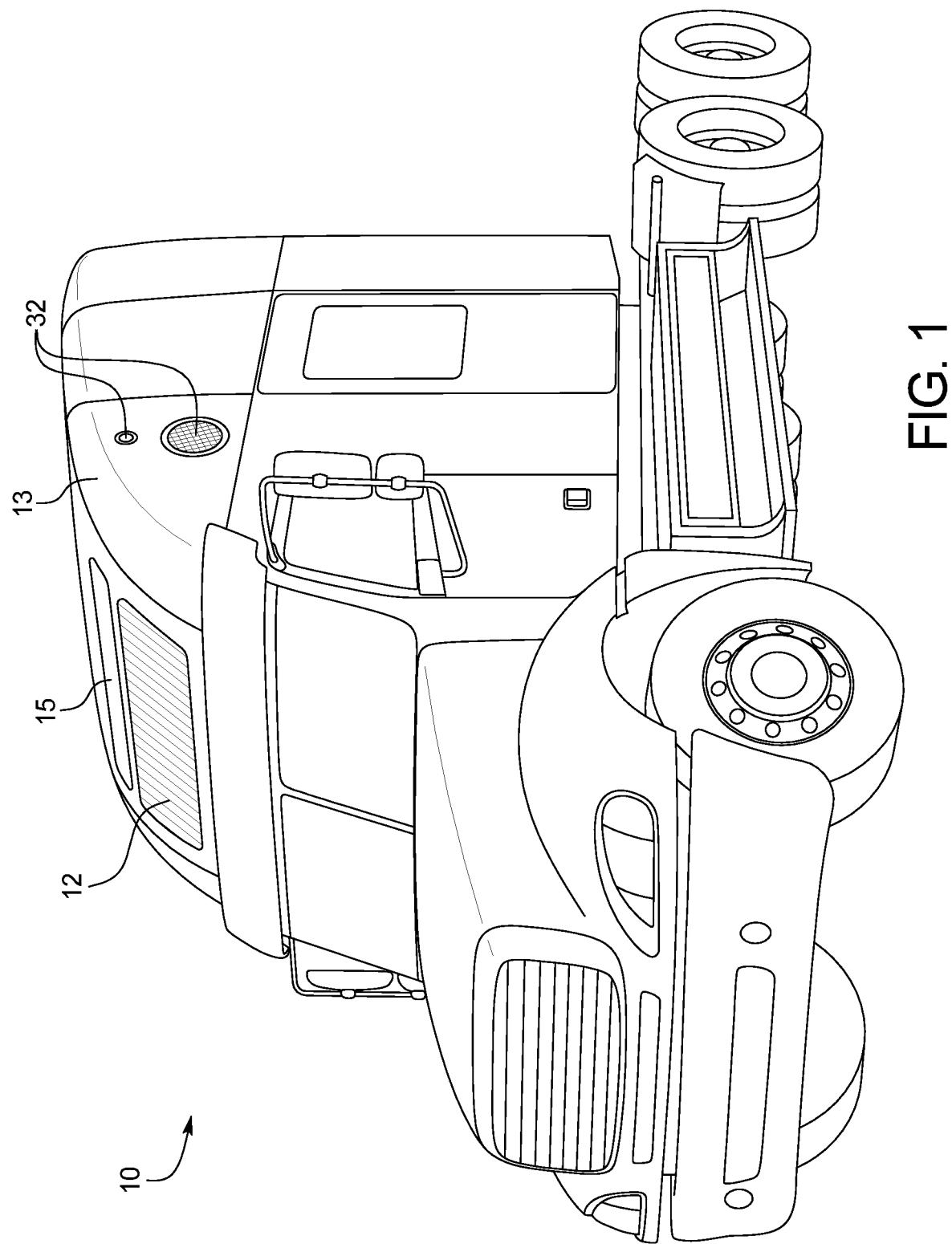
FIG. 1 is isometric view of a semi-trailer truck including a PEBI System mounted over the driver's cab and the battery pack cradle assembly access door outline on the truck step box assembly.

As shown in FIG. 1, the energy generator and storage system 10 can be included in an add-on unit that replaces the air deflector that would accompany a standard tractor unit. Air can flow through a front air inlet 12 facing the front of the tractor unit (i.e., the air inlet facing a front of the vehicle through which air enters when the vehicle is moving forward). The front air inlet 12 can include a debris screen to filter the incoming air or dust and debris and to protect the internal components of the energy generator and storage system 10.

As further shown in FIG. 1, the energy generator and storage system 10 (i.e., the PEBI System 10), other than the battery pack cradle and battery packs, may be located inside a hinged cover 13 (e.g., air dam 13) that, in addition to the front air inlet 12, includes a light bar 15 and screened side exhaust openings 32, adjacent and venting the space surrounding the evacuation blower 30 and emergency generator assembly 40, each of which is described in further detail below. The hinged cover 13, as shown in FIG. 2, is used to provide easier access to the components for cleaning, service, and repair.

Figure 2:
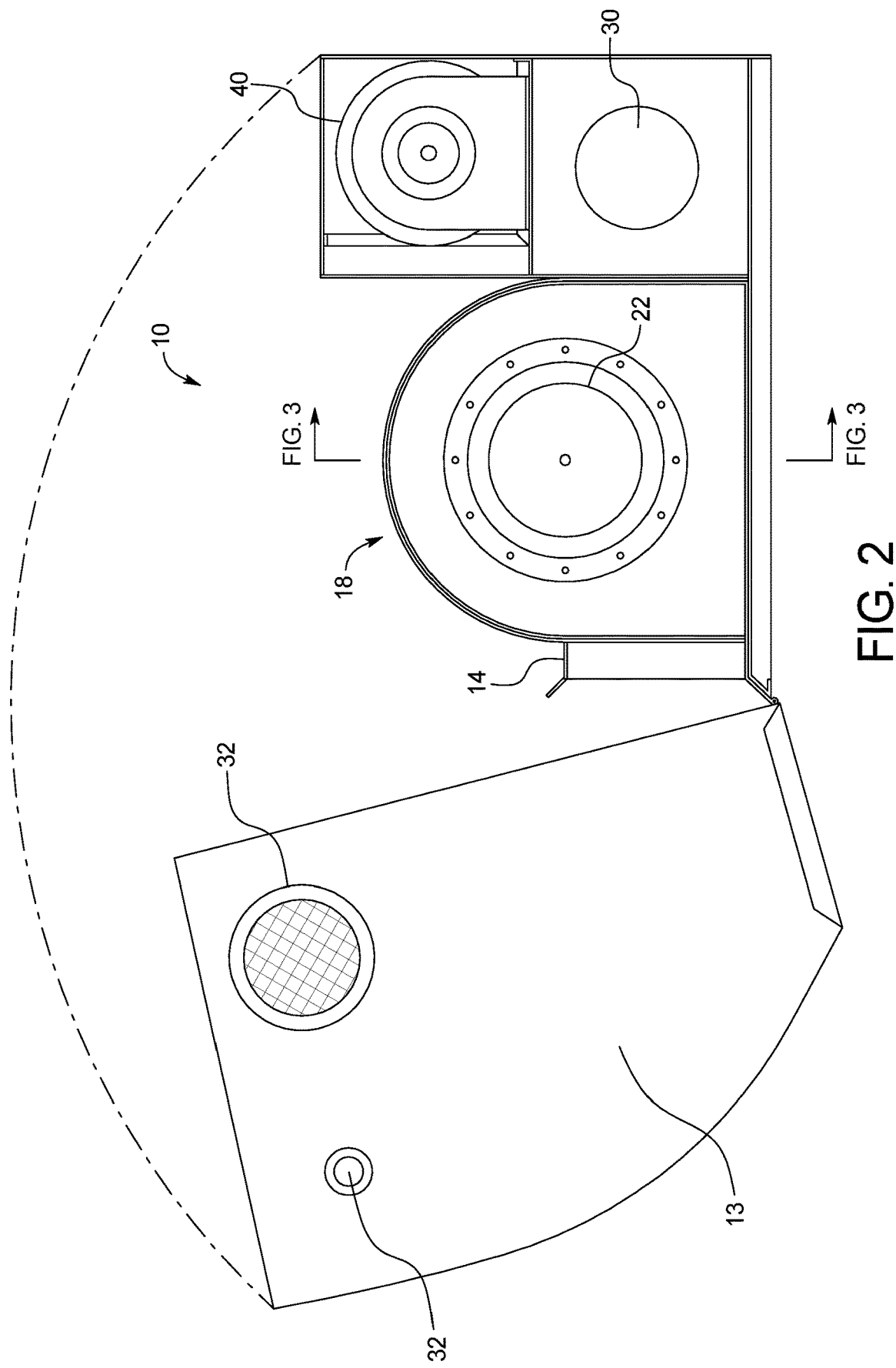
FIG. 2 is a side view of the PEBI System turbine assembly shown in FIG. 1 with the hinged outer cover opened for inspection or service.

FIG. 2 shows the radiator 14 through which air from the front inlet 12 passes through to maintain a constant warm temperature for the air passing through the system 10. The radiator 14 can help maintain a constant warm temperature for the air passing through the system 10. This is particularly helpful in the winter in cold-weather climates to reduce the threat of freezing within the system. The hot water or electric supply to the radiator 14 can protect the impeller 16 that is located just past the radiator 14 from ice, which could cause an imbalance or a complete freeze of the system 10. In warmer weather, a thermostat will shut off the hot water supply to the radiator 14 and the inflowing air will remain the same temperature as the surrounding ambient air. FIG. 2 further illustrates the position of the turbine assembly 18, generator/transmission assembly 22, evacuation blower 30, and emergency generator assembly 40.

Figure 3:
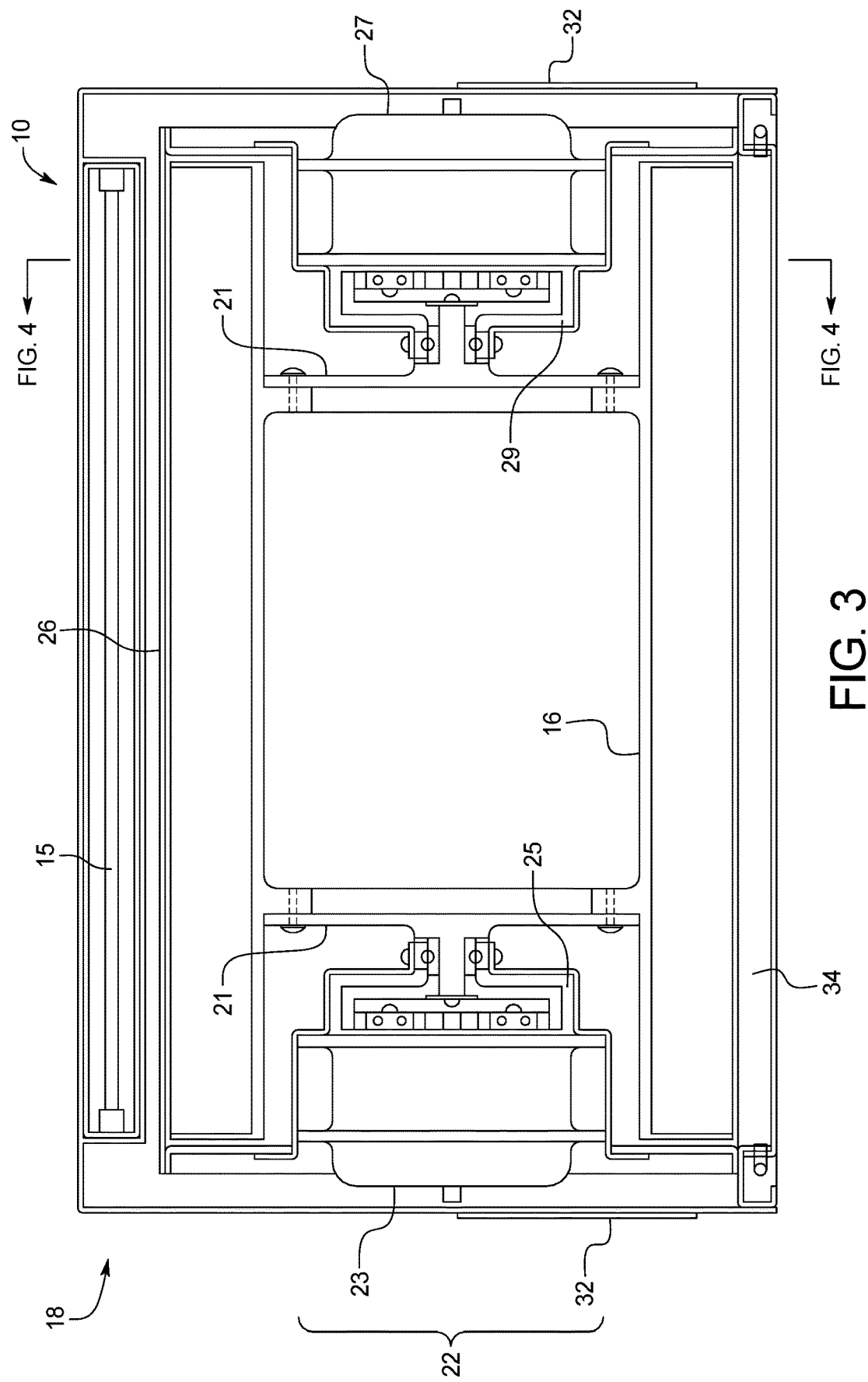
FIG. 3 is a frontal section of the turbine assembly of the PEBI System shown in FIG. 1.
Figure 4:
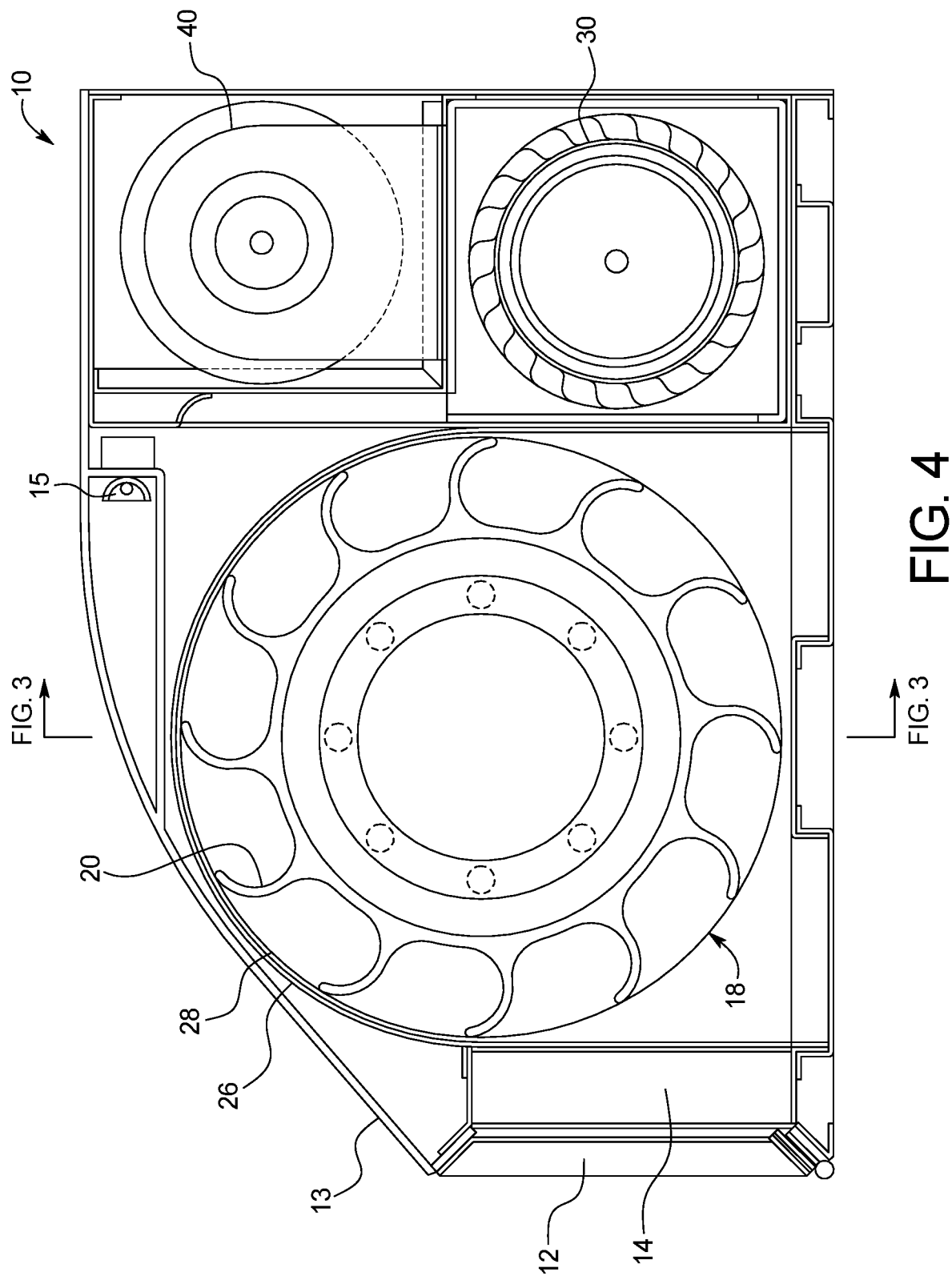
FIG. 4 is a side view section of the PEBI System shown in FIG. 1 showing the turbine assembly, the exhaust blower, and emergency generator assemblies of the PEBI System.

As shown in FIGS. 3 and 4, the system includes a turbine assembly 18 including multiple impeller air vanes 20 positioned such that air flowing through the air inlet 12 applies positive pressure to the front of one or more impeller air vanes 20 to turn the barrel impeller assembly 16 and drive one or more generator/transmission assemblies 22. As shown in FIGS. 3 and 4, the barrel impeller air vanes 20 are an integrally formed part of the barrel impeller 16.

In an example, a barrel impeller 16 can be positioned in sequence with the radiator 14. The barrel impeller 16 can be part of a turbine assembly 18, in which the barrel impeller 16 drives one or more generator/transmission assemblies 22. In an example, a single barrel impeller 16 drives a pair of generator/transmission assemblies 22 located on either side of the barrel impeller 16. The barrel impeller 16 can be a radial impeller that includes a plurality of air vanes 20 located along its outer circumference. The size, shape, and quantity of the impeller air vanes 20 is variable and can be tuned to match specific desired performance characteristics and environmental considerations. For example, the vanes 20 may be curved to help reduce the back-pressure exerted on the vanes 20 during the rotation of the impeller 16. In other embodiments, the impeller air vanes 20 may not be curved. As a further example, the impeller 16 may be a four-foot long barrel impeller, which is equivalent to the air vane air capture rate of an eight-foot diameter wind mill.

In one example, the turbine assembly 18 includes a turbine housing 26 including a mounting base with heated water pans and drainage system 34, a pair of right and left end panels, a top cover panel with a series of back-pressure relief vent holes 28, and a pair of right and left stepped transmission housing panels, all encasing the turbine assembly 18. A pair of left and right end caps 21 may be bolted to the turbine assembly 18 to create a sealed impeller chamber, all as shown in FIGS. 3 and 4. The turbine housing 26 shown in FIG. 3 may include, for example, a series of back-pressure relief vent holes 28 located along later stages of the rotation of the impeller 16. For example, the last 150 degrees of the 360 degrees of rotation may include back-pressure relief vent holes 28 which help to minimize the back-pressure that would build up and slow the rotation of the impeller 16. These back-pressure relief vent holes 28 improve the efficiency of the turbine assembly 18. The back-pressure relief vent holes 28 may be any number, orientation, shape, configuration, etc. as desired to accomplish the purpose of improving the efficiency of the rotation of the turbine assembly 18.

As the incoming air passes through the turbine assembly 18 and is captured by the barrel impeller air vanes 20 causing the impeller assembly 16 to rotate and drive the generator/transmission assemblies 22, the air flows through to an evacuation blower 30, which discharges the air flow through one or more screened side air outlets 32. The evacuation blower 30 creates a negative pressure in the downstream side of the turbine assembly 18 by evacuating air through one or more screened outlets 32 not facing the front of the vehicle. In the examples of the system in which the pneumatic barrel impeller assembly 18 includes back-pressure relief vent holes 28, the air can flow to the evacuation blower 30 directly from the pneumatic barrel impeller assembly 18, as well as through the back-pressure relief vent holes 28. There may be, for example, a single screened side air outlet 32 on each of the left side and right side (or both) of the PEBI System 10. In other examples, there may be multiple outlets 32 on each side of the vehicle. Side air outlets 32 are provided to vent the air flowing through the turbine assembly 18 and then evacuated by the blower 30, with separate screened outlets for the emergency generator assembly exhaust. The side air outlets 32 are employed because they reduce the likelihood of infiltration by snow or rain as compared to an outlet 32 located along the top surface of the system 10. The turbine housing mounting base may also include heated water pans and a drainage system 34 designed to remove any moisture from rain or snow that does manage to infiltrate the PEBI System 10.

The evacuation blower 30 creates a vacuum, or low-pressure area, within the turbine housing 26, which helps to increase air flow through the turbine assembly 18 by pulling air through the front air inlet 12 and also pulling air through the turbine housing top panel back-pressure relief vent holes 28 (to reduce drag on the impeller), which increases air flow through the entire turbine assembly 18 and over the front of the impeller air vanes 20 while creating a negative pressure on the rear of the impeller air vanes, creating more power to rotate the impeller 16 and drive the generator/transmission assemblies 22 at the designed rpms to create the electric power to operate the vehicle and charge the battery packs as the blower exhausts the air through screened side vents 32.

The PEBI System 10 may also include an emergency generator assembly 40 located, for example, behind the pneumatic barrel impeller assembly 18 and above the evacuation blower 30. The emergency generator assembly 40 may be an internal combustion engine run off fossil fuels. Alternatively, the emergency generator assembly 40 may be any form of generator appropriate for use as a backup in the event of the main system failure. It is contemplated that the emergency generator assembly 40 can be designed to maintain the battery charge (in emergency situations where the turbine generators are not functioning) adequate to operate the vehicle under battery power long enough to reach a repair station or place of shelter to wait for repairs. Accordingly, the emergency generator assembly 40 may take any form of power generator capable of supplying the requisite power to the vehicle under temporary and emergency conditions.

As shown in FIG. 3, the generator/transmission assembly 22 can include a first generator 23 having a first transmission 25 and a second generator 27 having a second transmission 29. For example, the system may include a first transmission 25 coupling the pneumatic barrel impeller assembly 18 to a first generator 23 located on a first side of the pneumatic barrel impeller assembly 18 along an axis about which the pneumatic barrel impeller assembly 18 rotates. The system may also include a second transmission 29 coupling the pneumatic barrel impeller assembly 18 to a second generator 27 located on a second side of the pneumatic barrel impeller assembly 18 along the axis about which the pneumatic barrel impeller assembly 18 rotates. The rotation of the pneumatic barrel impeller assembly 18 can drive the first generator 23 and the second generator 27 simultaneously. Based on the disclosure provided herein, it will be understood by those skilled in the art that the generator/transmission assembly 22 may be a single unit or include any number of associated generator/transmission assemblies 22.

Figure 5:
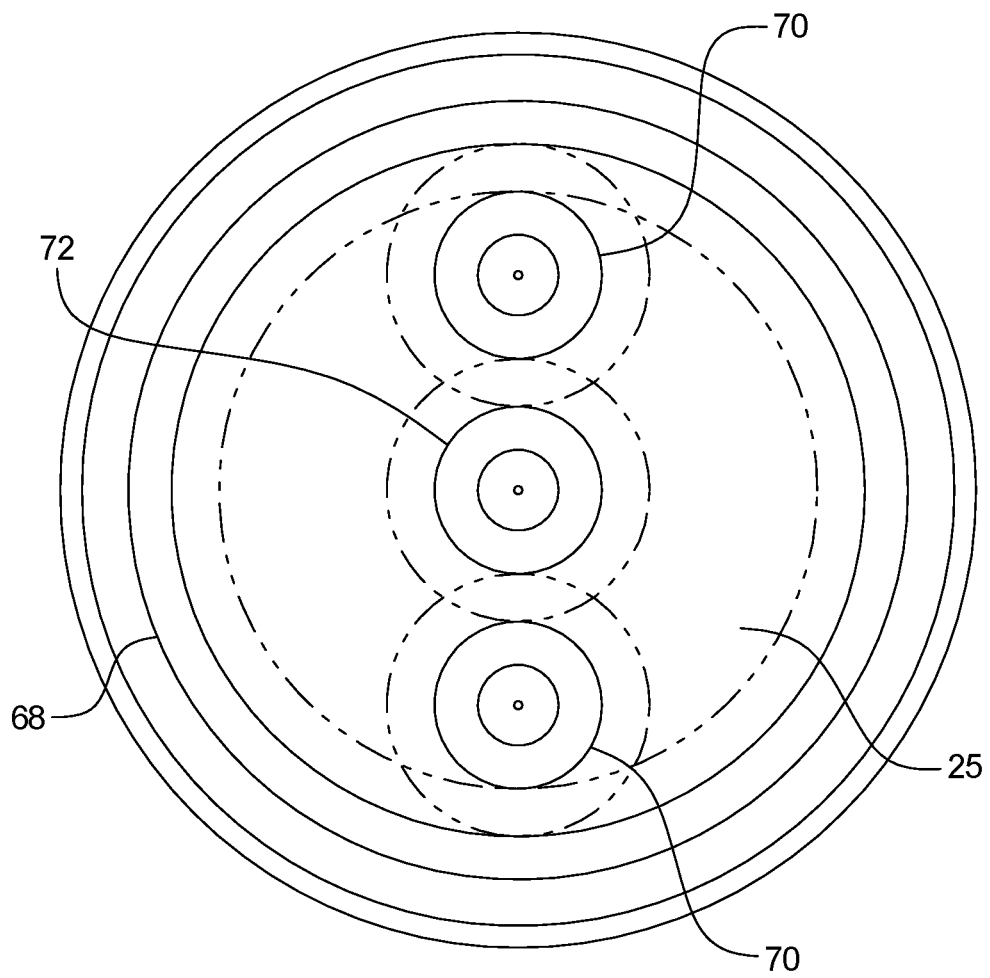
FIG. 5 is a frontal view section of a turbine assembly transmission showing the gear arrangement of the PEBI System shown in FIG. 1.
Figure 6:
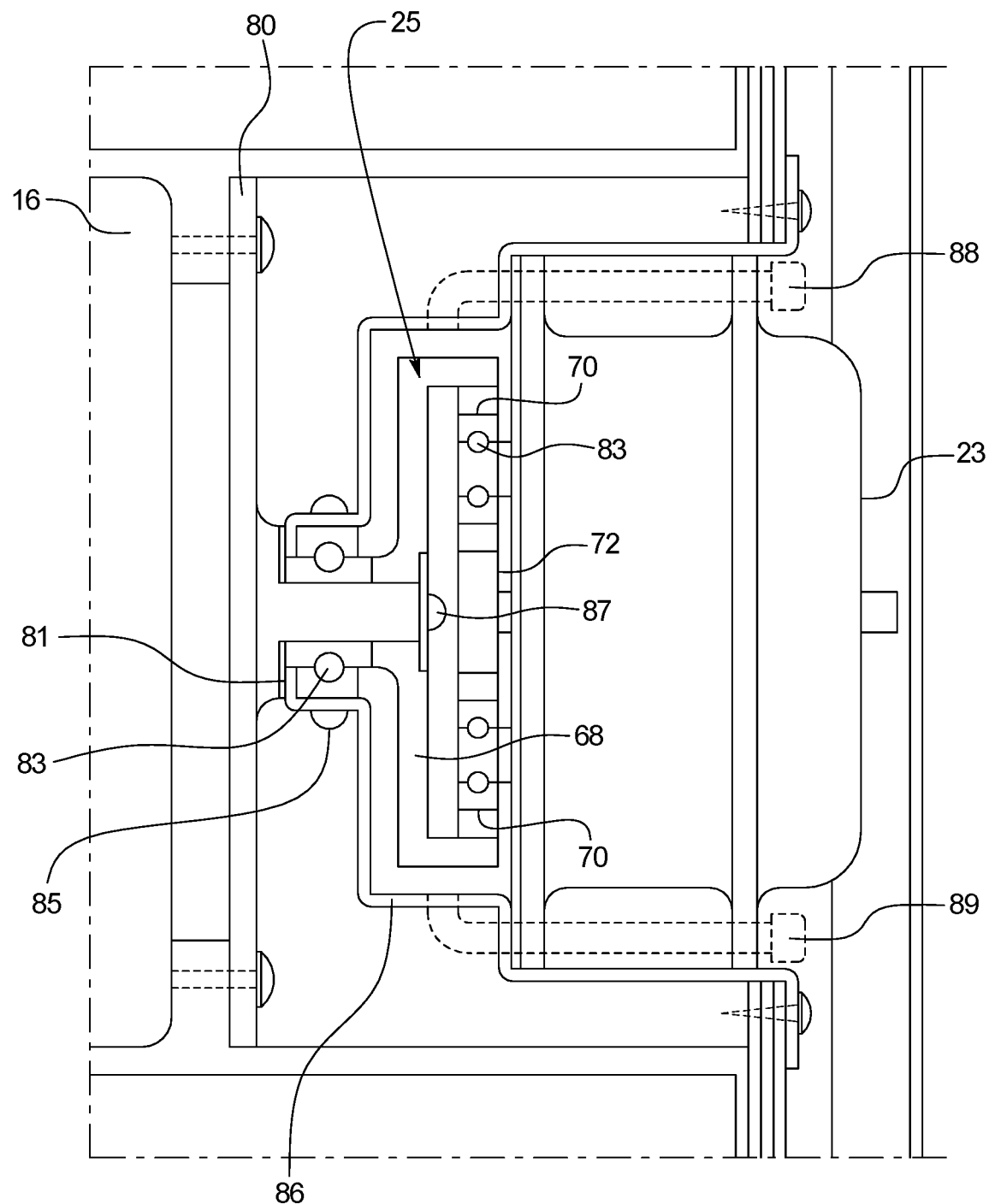
FIG. 6 is a side view section of the generator/transmission assembly mounted in a stepped housing, mounted in one end of the barrel turbine impeller assembly of the PEBI System shown in FIG. 1.

FIG. 5 illustrates a frontal section through a first transmission 25 showing a gear arrangement. FIG. 6 is a side view section through the first transmission 25 and first generator 23. The second transmission 27 is identical to the first transmission 25 and, therefore, not independently shown. Each of the first transmission 25 and the second transmission 29 may include a first power transfer gear 70 and an optional second power transfer gear 70 engaged with, and balancing the load delivered to, a generator gear 72. As shown, the first power transfer gear 70 and the second power transfer gear 70 may be driven by an impeller ring gear 68.

As shown in FIG. 6, the first transmission 25 and first generator 23 operate in coordination with elements including the impeller end cap 80, an oil seal 81, sealed bearings 83, a bearing lock screw 85, a stepped housing 86, an impeller ring gear bolt and washer 87, an oil fill tube 88, and an oil drain tube 89.

Figure 7:
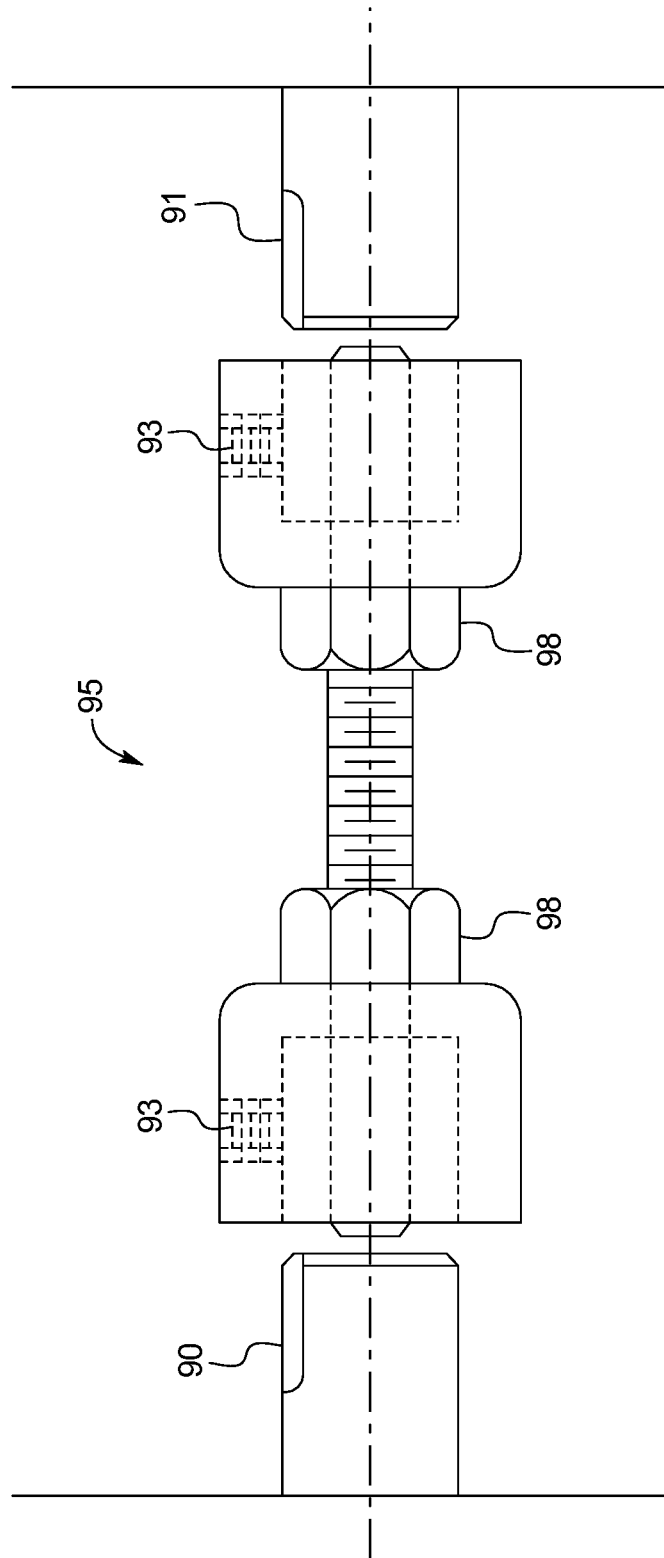
FIG. 7 is a schematic diagram of a generator shaft locking device for use when tandem PEBI Systems are used, as shown in FIG. 1.

FIG. 7 is a schematic diagram of a locking assembly 95, which is used when two PEBI Systems 10 are used in tandem for high horse power engines. The locking assembly 95, which includes adjustable nuts 98 and set screws 93, is designed to fit between the two PEBI systems 10 and may be used to lock the first generator shaft 90 of the first PEBI system 10 to the second generator shaft 91 of the second PEBI system 10 to assure both PEBI systems 10 rotate in unison.

Figure 8:
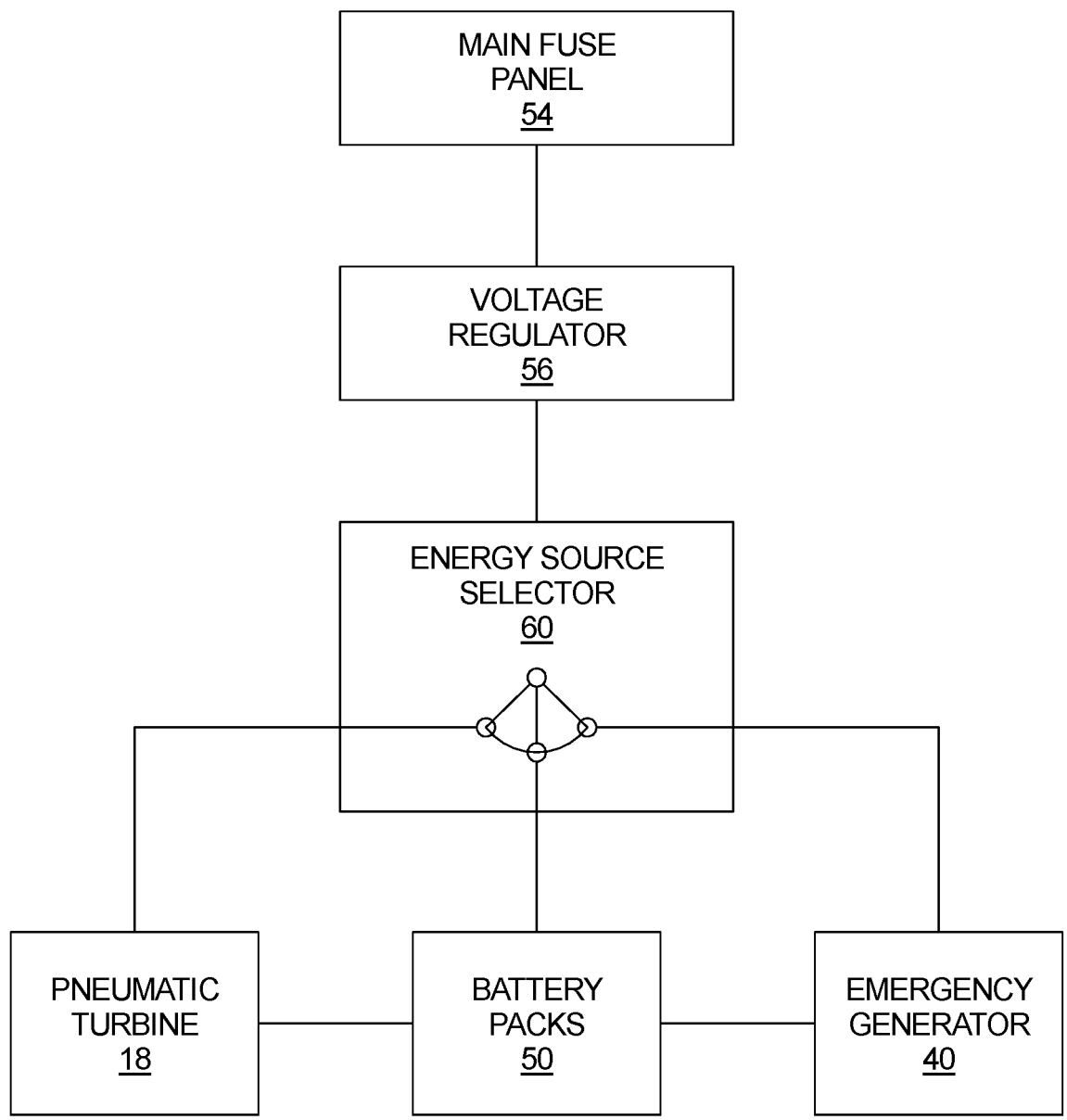
FIG. 8 is a schematic of an energy source selector and the associated energy sources.

As shown in FIG. 8, the system 10 may include an energy source selection module 60 to route energy within the vehicle. The energy source selection module 60 shown in FIG. 8 is in electrical connection with the turbine assembly 18, the one or more battery packs 50, an emergency generator assembly 40, and a voltage regulator 56 and fuse panel 54. The energy source selection module 60 selects an energy source to connect to the voltage regulator 56 and fuse panel 54, wherein the generator/transmission assembly 22, the one or more battery packs 50, and the emergency generator assembly 40 are energy sources available to be selected by the energy source selection module 60. The voltage regulator 56 distributes power to the fuse panel 54, which distributes electricity to the necessary components within the vehicle.

Figure 9:
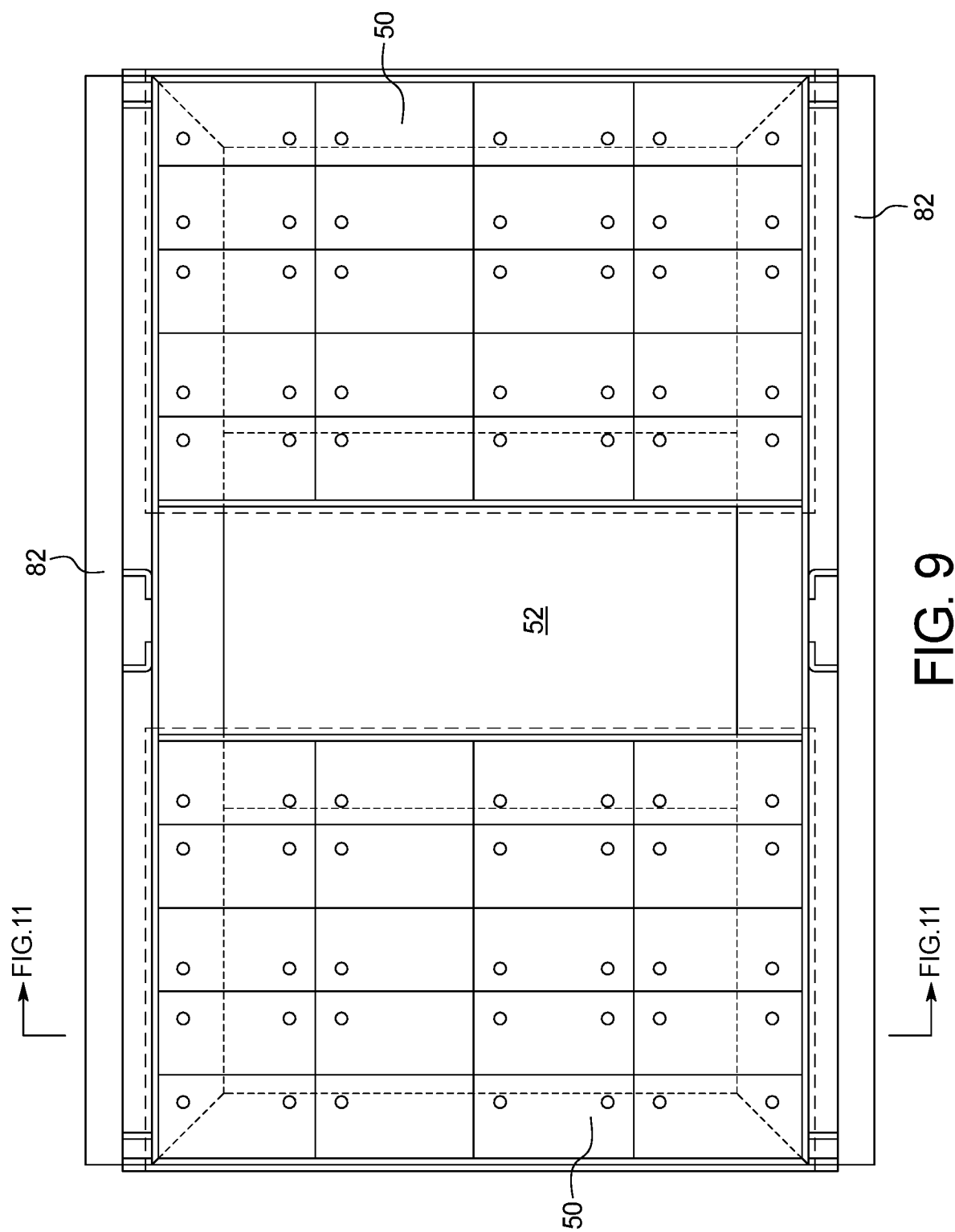
FIG. 9 is a top view of a first battery pack cradle assembly with the battery packs used in the PEBI System shown in FIG. 1.
Figure 10:
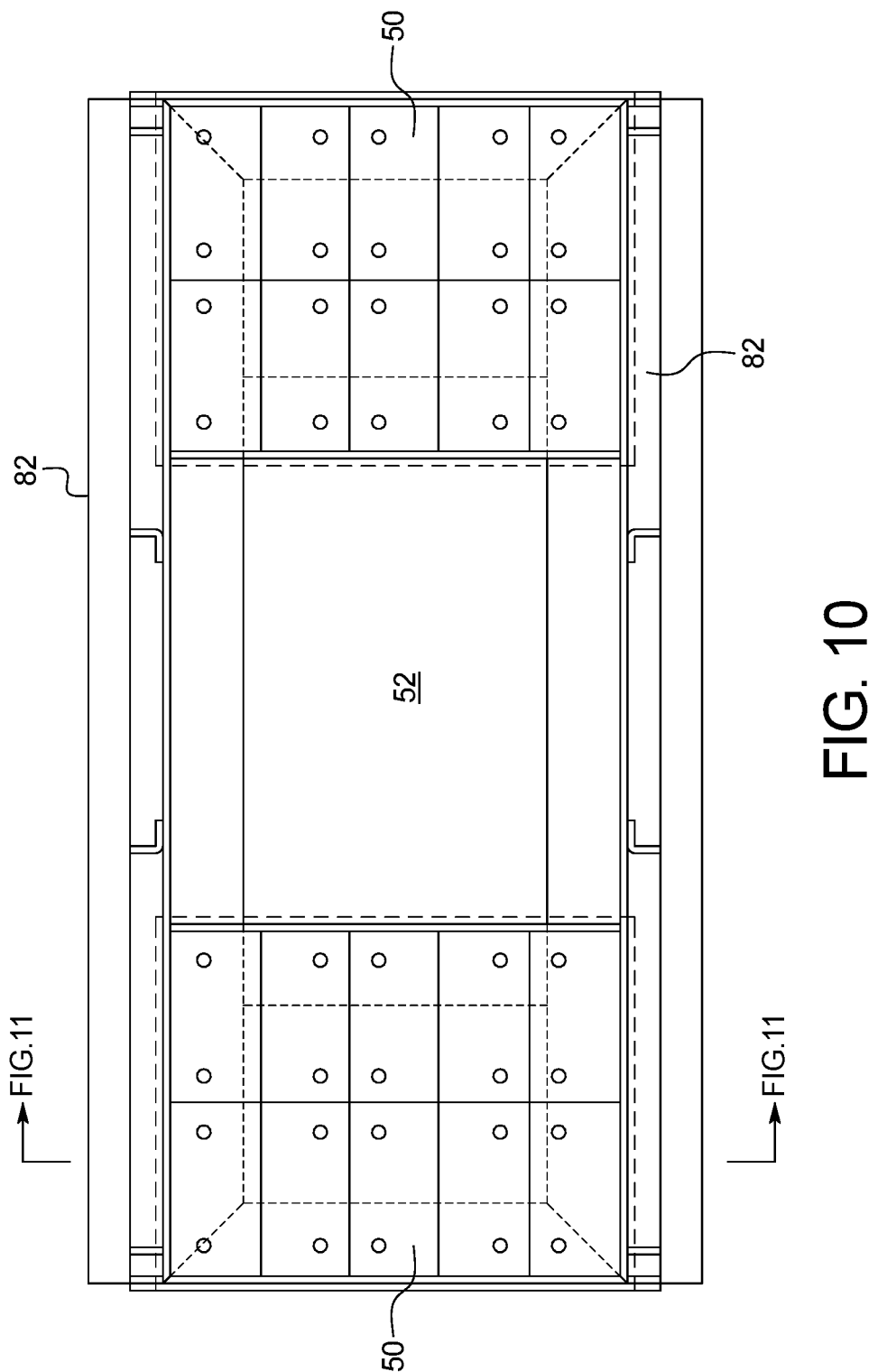
FIG. 10 is a top view of a second battery pack cradle assembly with the battery packs used in the PEBI System shown in FIG. 1.
Figure 11:
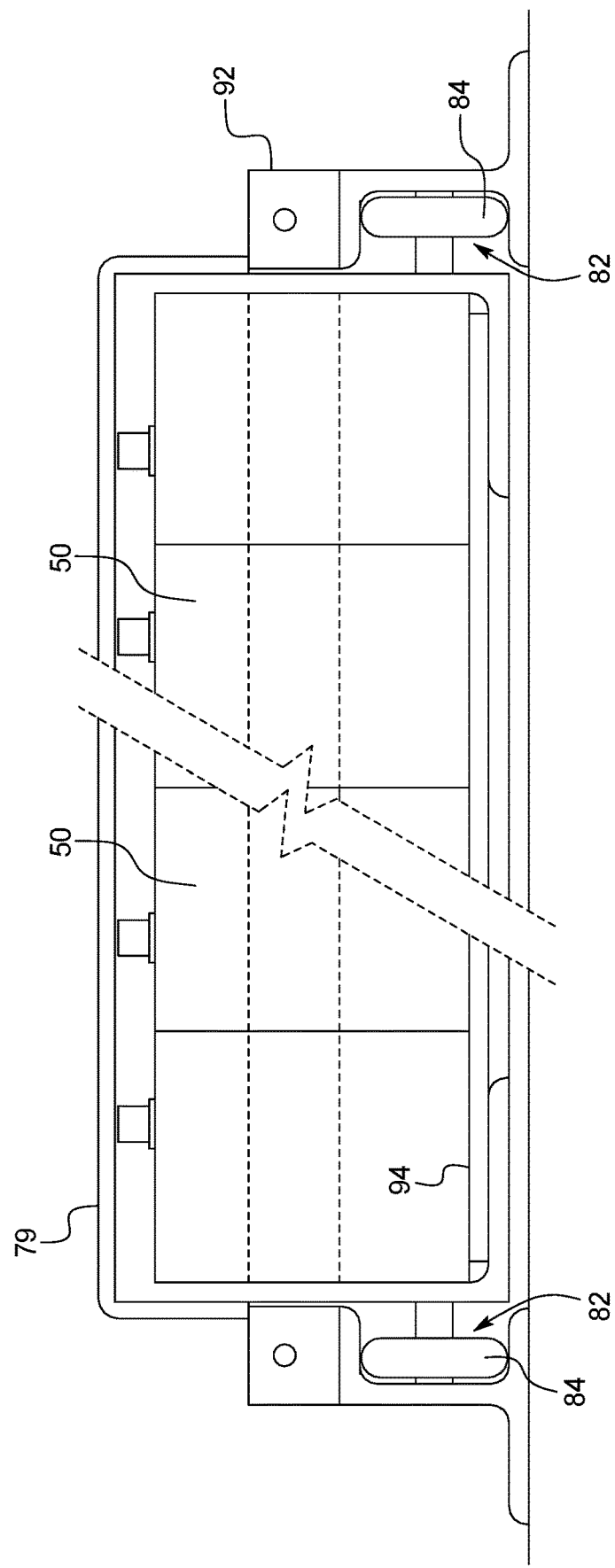
FIG. 11 is a cross-section view of a battery pack cradle assembly and battery pack used in the PEBI System shown in FIG. 1.

As shown in FIGS. 9-11, the power generated by the system 10 is stored in one or more battery packs 50. The battery packs 50 can use recyclable, lead acid deep cycle marine batteries. For example, the system may use 220-minute reserve capacity at 23-amp draw (or better) batteries. Since the batteries are recyclable, their threat to the environment is minimized. The batteries may be joined in ten-unit or twenty-unit battery packs 50. For example, a small horsepower engine (e.g., 250 hp or less) may use two ten-unit battery packs 50, and a large horsepower engine (e.g., over 250 hp) may require two twenty-unit battery packs 50. A high horse power engine may also require two PEBI Systems 10 in a tandem configuration. The battery packs 50 may be designed to be carried on battery cradles 52 to enable complete battery access for service. If a single battery in a pack 50 needs to be replaced, it can be replaced without having to replace the entire battery pack 50. The number of batteries used in each battery pack 50 is variable, based on the electrical requirements of the motor being used. It may be noted that, although the battery packs 50 depicted are composed of 12-volt batteries, the batteries are wired in series and, therefore, produce much higher voltage (240v, 360v, 480v, etc.) depending on how many batteries are assembled into each battery pack 50.

When the vehicle is in motion, the PEBI System 10 can both produce electric power to operate the vehicle and charge the battery packs 50. For example, in the primary embodiments contemplated, at posted speed limits of 25 mph or more, the PEBI system 10 can produce adequate power to operate the vehicle motor and all other electric systems and recharge the pattery packs 50. Between 19 and 25 mph, the PEBI system 10 can produce adequate power to recharge and maintain battery charge while vehicle is operating on battery power only. The generator/transmission assembly 22 is driven by the impeller 16 through fixed ratio geared transmissions 25 and 29 to increase the rpm of the generators 23 and 27 at low vehicle speeds to produce the electric power required for the system 10. In one contemplated embodiment, at low speeds (e.g., below 25 mph), the system 10 charges the pattery packs 50 with the power generated. At low speeds, the motor and all of the electric systems are operational and driven by battery power. In this embodiment, at higher speeds (e.g., above 25 mph), the system 10 generates power to charge the pattery packs 50, drive the vehicle motor, and power the vehicle's electric systems. In some examples, at over 25 mph, the system 10 switches the vehicle motor to direct drive from the generators and disconnects the pattery packs 50 from the motor, while continuing to recharge the pattery packs 50 from the turbine assembly 18. Once the pattery packs 50 are fully charged, they may be disconnected from the impeller 16 until the vehicle has slowed to a speed at which battery power is required for continued operation of the electric motor and systems.

Figure 12:
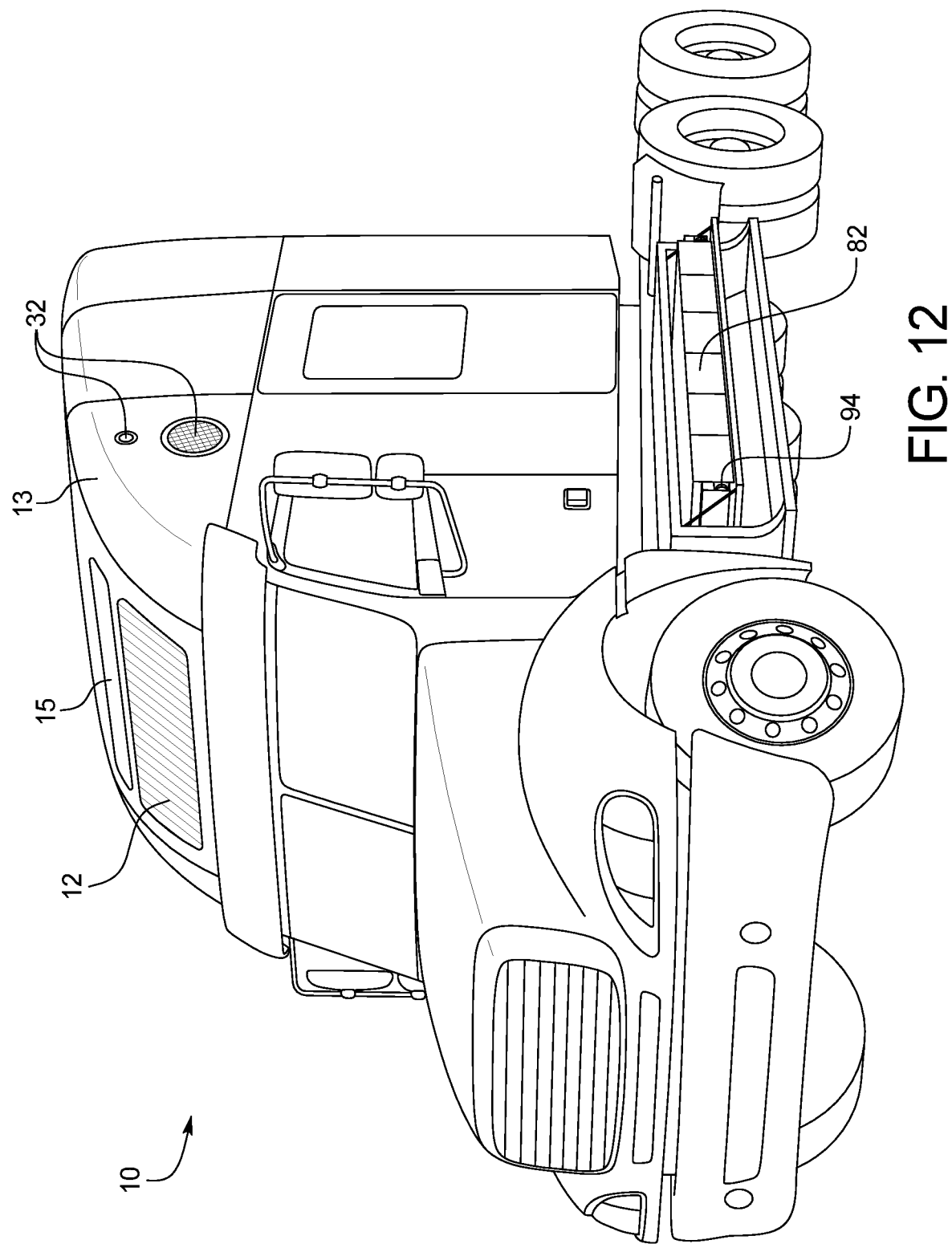
FIG. 12 is an isometric view of a semi-tractor truck with a PEBI System mounted over the driver's cab and the battery pack cradle assembly access door open and the battery pack partially withdrawn into a second position.

In the system, the generator/transmission assembly 22 can charge one or more battery packs 50 composed of assemblies of recyclable, lead-acid, deep cycle, marine type, 12-volt batteries. The battery packs 50 are mounted on one or more sliding battery pack cradles 52, each of which can be slid from a first position to a second position via one or more rollers 84 in a roller channel 82, as shown in FIGS. 9-11. In the first position, the one or more battery packs 50 are located within the vehicle. In the second position, at least a portion of the one or more battery packs 50 is located outside of the vehicle to make it easier to service, or replace, the one or more battery packs 50, as shown in FIG. 12.

In an example, the battery cradles 52 can include a battery cradle bottom plate 94 to support the pattery packs 50. The pattery packs 50 can be removed or serviced by sliding out the battery cradle assembly 82 on its rollers 84 far enough to service the pattery packs 50. The battery cradle assembly 82 can be locked in the closed position by the battery cradle locking bar 92, as shown in FIGS. 9, 10, and 11. As shown in FIG. 11, the pattery packs 50 may be located under a battery cover 79.

In an example, when the vehicle is stopped, the motor and systems other than the lights, HVAC, steering and brakes, can be shut down (e.g. manually and/or automatically shut down), thereby reducing the total electric draw to less than 20 amps. The contemplated battery packs can support a 20 amp draw for several days without charging.

As noted above, the PEBI system 10 may be retrofit onto existing vehicles or be a PEBI System 10 provided and installed by the vehicle manufacturer as original equipment. Some examples of the energy generator and storage system 10 are designed to be a modular, plug-in component system, with the main components of the system being designed and manufactured to be easily disconnected, removed, and replaced, with new plug-in components. A modular design helps to eliminate the need for highly skilled mechanics to do repairs in the field, which reduces down time (i.e., inoperable time) for the vehicles. The status of the individual system components can be monitored from within the cabin such that an operator can easily identify the performance or malfunction of each component.

It should be noted that various changes and modifications to the presently preferred embodiments described herein will be apparent to those skilled in the art. Such changes and modifications may be made without departing from the spirit and scope of the present invention and without diminishing its attendant advantages. For example, even though the primary examples of the PEBI system provided herein have focused on use in the trucking industry, those skilled in the art will recognize that the PEBI system can be (and is explicitly intended to be) modified to be used throughout a wide range of vehicles, including the automobile industry.

I claim:

1. A vehicle mounted energy generator and storage system comprising:
    an air inlet facing a front of the vehicle through which incoming air enters when the vehicle is moving forward;
    a turbine assembly including a barrel impeller and one or more impeller air vanes positioned on the barrel impeller such that the incoming air flowing through the air inlet applies positive pressure to a front of the one or more impeller air vanes to turn the barrel impeller and drive one or more generator/transmission assemblies to supply electric power to one or more battery packs or to provide a direct electric power source to operate the vehicle; and
    an evacuation blower applying negative air pressure to a rear of the one or more impeller air vanes by evacuating incoming air through one or more air outlets not facing the front of the vehicle.

2. The vehicle mounted energy generator and storage system of claim 1, further including a radiator between the air inlet and the turbine assembly such that the incoming air entering the vehicle is heated towards the temperature of the radiator before reaching the turbine assembly.

3. The vehicle mounted energy generator and storage system of claim 1, further including a housing surrounding the turbine assembly.

4. The vehicle mounted energy generator and storage system of claim 3, wherein the housing includes one or more back-pressure relief vent holes.

5. The vehicle mounted energy generator and storage system of claim 1, further including an energy source selection module in electrical connection with the one or more generator/transmission assemblies, the one or more battery packs, a voltage regulator, and a fuse panel.

6. The vehicle mounted energy generator and storage system of claim 5, wherein the energy source selection module selects an energy source to connect to the voltage regulator and the fuse panel, wherein the one or more generator/transmission assemblies, the one or more battery packs, and an emergency generator assembly are energy sources available to be selected by the energy source selection module.

7. The vehicle mounted energy generator and storage system of claim 6, wherein the emergency generator assembly is a fossil fuel driven internal combustion engine.

8. The vehicle mounted energy generator and storage system of claim 1, wherein the turbine assembly is a pneumatic barrel impeller turbine assembly.

9. The vehicle mounted energy generator and storage system of claim 8, wherein the one or more impeller air vanes of the turbine assembly are a plurality of curved impeller air vanes.

10. The vehicle mounted energy generator and storage system of claim 8, wherein the one or more generator/transmission assemblies includes a first transmission coupling the turbine assembly to a first generator located on a first side of the turbine assembly along an axis about which the turbine assembly rotates and a second transmission coupling the turbine assembly to a second generator located on a second side of the pneumatic barrel turbine assembly along the axis about which the turbine assembly rotates such that the rotation of the turbine assembly drives a first generator/transmission assembly and a second generator/transmission simultaneously and in unison.

11. The vehicle mounted energy generator and storage system of claim 10, wherein the air inlet delivers air along a lower half of the turbine assembly at a front side of the turbine assembly, the evacuation blower pulls air along the lower half of the turbine assembly along a rear side of the turbine assembly, and a housing surrounds the turbine assembly and includes one or more back-pressure relief vent holes along a portion of the housing enclosing an upper half of the turbine assembly.

12. The vehicle mounted energy generator and storage system of claim 11, wherein the evacuation blower is located in a chamber and fed air flow through a first opening to a passage creating a low-pressure environment on the second side of the turbine assembly in fluid communication with the one or more back-pressure relief vent holes, creating a negative pressure environment on the second side of the turbine assembly and surrounding the upper half of the turbine assembly.

13. The vehicle mounted energy generator and storage system of claim 10, wherein each of the first transmission and the second transmission includes a first power transfer gear and a second power transfer gear engaged with, and balancing the load delivered to, a generator gear, wherein the first power transfer gear and the second power transfer gear are driven by an impeller ring gear.

14. The vehicle mounted energy generator and storage system of claim 1, wherein the outlet faces a right side or a left side of the vehicle.

15. The vehicle mounted energy generator and storage system of claim 1, wherein the one or more battery packs include a plurality of recyclable, lead-acid, deep cycle, marine type, 12-volt batteries.

16. The vehicle mounted energy generator and storage system of claim 15, wherein the one or more battery packs are mounted on one or more sliding battery pack cradles, each of which can be slid from a first position to a second position, wherein, in the first position, the one or more battery packs are located within the vehicle and, in the second position, at least a portion of the one or more battery packs is located outside of the vehicle.

17. A vehicle mounted energy generator and storage system comprising:
an air inlet facing a front of the vehicle through which air enters when the vehicle is moving forward;
a pneumatic barrel impeller assembly including one or more curved barrel impeller air vanes positioned such that air flowing through the air inlet applies positive pressure to a front lower half of the pneumatic barrel impeller assembly such that the one or more curved barrel impeller air vanes turn the pneumatic barrel impeller assembly and drive one or more generator/transmission assemblies including a first transmission coupling the pneumatic barrel turbine assembly to a first generator located on a first side of the pneumatic barrel impeller assembly along an axis about which the pneumatic barrel impeller assembly rotates and a second transmission coupling the pneumatic barrel impeller assembly to a second generator located on a second side of the pneumatic barrel impeller assembly along the axis about which the pneumatic barrel impeller assembly rotates such that the rotation of the pneumatic barrel impeller assembly drives the first generator and the second generator simultaneously and in unison, wherein each of the first transmission and the second transmission includes a first power transfer gear and a second power transfer gear engaged with, and balancing the load delivered to, a generator gear, wherein the first power transfer gear and the second power transfer gear are driven by an impeller ring gear;
a housing including one or more back-pressure relief vent holes surrounding a top half of the pneumatic barrel impeller assembly;
a radiator between the air inlet and the pneumatic barrel impeller assembly such that the air entering the vehicle is heated towards the temperature of the radiator before reaching the pneumatic barrel impeller assembly;
one or more battery packs receiving energy generated by the one or more generator/transmission assemblies mounted on one or more sliding battery pack cradles, each of which can be slid from a first position to a second position, wherein, in the first position, the one or more battery packs are located within the vehicle and, in the second position, at least a portion of the one or more battery packs is located outside of the vehicle;
an energy source selection module in electrical connection with the one or more generator/transmission assemblies, the one or more battery packs, an emergency generator assembly that is a fossil fuel driven internal combustion engine, a voltage regulator, and a fuse panel, wherein the energy source selection module selects an energy source to connect to the voltage regulator and the fuse panel, wherein the one or more generator/transmission assemblies, the one or more battery packs, and an emergency generator assembly are energy sources available to be selected by the energy source selection module; and an evacuation blower applying negative pressure to a rear lower half of the pneumatic barrel impeller assembly by evacuating air through one or more outlets facing a right side or a left side of the vehicle, wherein the evacuation blower is located in a chamber and fed air flow through a first opening to the rear side of the lower half of the pneumatic barrel impeller assembly and to a second opening to a passage in fluid communication with the one or more back-pressure relief vent holes.

18. The vehicle mounted energy generator and storage system of claim 17, wherein the energy generator and storage system is retrofit onto the vehicle.

19. The vehicle mounted energy generator and storage system of claim 17, wherein the vehicle is a tractor unit of a semi-tractor and trailer truck.

20. A vehicle including an energy generator and storage system comprising:

an air inlet facing a front of the vehicle through which air enters when the vehicle is moving forward;

a pneumatic barrel impeller assembly including one or more curved impeller air vanes positioned such that air flowing through the air inlet applies positive pressure to a front lower half of the pneumatic barrel impeller assembly such that the one or more impeller air vanes turn the pneumatic barrel impeller assembly and drive one or more generator/transmission assemblies including a first transmission coupling the pneumatic barrel impeller assembly to a first generator located on a first side of the pneumatic barrel impeller assembly along an axis about which the pneumatic barrel impeller assembly rotates and a second transmission coupling the pneumatic barrel impeller assembly to a second generator located on a second side of the pneumatic barrel impeller assembly along the axis about which the pneumatic barrel impeller assembly rotates such that the rotation of the pneumatic barrel impeller assembly drives the first generator and the second generator simultaneously and in unison, wherein each of the first transmission and the second transmission includes a first power transfer gear and a second power transfer gear engaged with, and balancing the load delivered to, a generator gear, wherein the first power transfer gear and the second power transfer gear are driven by an impeller ring gear;

a turbine housing assembly including a top cover panel including one or more back-pressure relief vent holes surrounding a top half of the pneumatic barrel impeller assembly;

a radiator between the air inlet and the pneumatic barrel impeller assembly such that the air entering the pneumatic barrel impeller assembly is heated towards the temperature of the radiator before reaching the pneumatic barrel impeller assembly;

one or more battery packs including a plurality of recyclable, lead-acid, deep cycle, marine type, 12-volt batteries receiving energy generated by the one or more generator/transmission assemblies mounted on one or more sliding battery pack cradles, each of which can be slid from a first position to a second position or a third position, wherein, in the first position, the one or more battery packs are located within the vehicle and, in the second position, at least a portion of the one or more battery packs is located outside a left side of the vehicle and, in the third position, at least a portion of the one or more battery packs is located outside a right side of the vehicle;

an energy source selection module in electrical connection with the one or more generator/transmission assemblies, the one or more battery packs, an emergency generator assembly that is a fossil fuel driven internal combustion engine, a voltage regulator, and a fuse panel, wherein the energy source selection module selects an energy source to connect to the voltage regulator and the fuse panel, wherein the one or more generator/transmission assemblies, the one or more battery packs, and an emergency generator assembly are energy sources available to be selected by the energy source selection module; and an evacuation blower applying negative pressure to a rear lower half of the pneumatic barrel impeller assembly by evacuating air through an outlet facing a right side or a left side of the vehicle, wherein the evacuation blower is located in a chamber and fed air flow through a first opening to the rear side of the lower half of the pneumatic barrel impeller assembly and to a second opening to a passage in fluid communication with the one or more back-pressure relief vent holes.

* * * * *